United States Patent
Jung

(10) Patent No.: US 11,577,779 B2
(45) Date of Patent: Feb. 14, 2023

(54) CONTROL METHOD OF REDUCING A STEERING LOAD OF AN IN-WHEEL MOTOR VEHICLE

(71) Applicants: HYUNDAI MOTOR COMPANY, Seoul (KR); KIA MOTORS CORPORATION, Seoul (KR)

(72) Inventor: Dae Suk Jung, Gwacheon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 388 days.

(21) Appl. No.: 17/021,093

(22) Filed: Sep. 15, 2020

(65) Prior Publication Data

US 2021/0155287 A1    May 27, 2021

(30) Foreign Application Priority Data

Nov. 26, 2019   (KR) .................. 10-2019-0153067

(51) Int. Cl.
*B62D 15/02*   (2006.01)
*B60W 30/18*   (2012.01)
*B60W 40/09*   (2012.01)

(52) U.S. Cl.
CPC ..... *B62D 15/021* (2013.01); *B60W 30/18109* (2013.01); *B60W 40/09* (2013.01); *B60W 2510/20* (2013.01); *B60W 2520/40* (2013.01)

(58) Field of Classification Search
CPC .... B62D 15/021; B62D 9/002; B62D 5/0463; B62D 6/002; B62D 6/10; B60W 30/18109; B60W 40/09; B60W 2510/20; B60W 2520/40; B60W 2520/10; B60W 2540/12; B60W 2540/18; B60W 2710/083; B60W 2710/182; B60W 10/08; B60W 10/184; B60W 30/045; B60W 10/20; B60W 10/18; B60W 40/12; B60W 2422/70; B60K 7/0007

See application file for complete search history.

(56) References Cited

U.S. PATENT DOCUMENTS

| | | | |
|---|---|---|---|
| 6,543,569 B1* | 4/2003 | Shimizu | B21K 1/767 |
| | | | 180/444 |
| 9,592,848 B1* | 3/2017 | Hirate | B62D 6/008 |
| 2010/0174463 A1* | 7/2010 | Uragami | B60W 40/112 |
| | | | 701/70 |

(Continued)

*Primary Examiner* — Sze-Hon Kong
(74) *Attorney, Agent, or Firm* — Lempia Summerfield Katz LLC

(57) ABSTRACT

A control method of an in-wheel motor vehicle includes: determining, by a controller, a state of a steering load that is a load of a steering system; maintaining, by the controller, a front wheel brake in a released state, when the state of the steering load is in a high load state of a predetermined level or more; determining, by the controller, a tire angle of a front wheel according to a driver steering input based on driver steering input information in the released state of the front wheel brake; determining, by the controller, a required tire rotational angle of the front wheel by using the determined tire angle of the front wheel; and reducing, by the controller, the steering load by driving an in-wheel motor of the front wheel for a compensation by the determined required tire rotational angle of the front wheel.

10 Claims, 4 Drawing Sheets

(56) References Cited

U.S. PATENT DOCUMENTS

| | | | |
|---|---|---|---|
| 2011/0029200 A1* | 2/2011 | Shah | B62D 5/008 701/41 |
| 2014/0012466 A1* | 1/2014 | Tanno | B60C 23/004 701/36 |
| 2014/0343791 A1* | 11/2014 | Suzuki | B62D 5/046 701/41 |
| 2015/0012158 A1* | 1/2015 | Makino | B60W 10/18 701/22 |
| 2016/0068183 A1* | 3/2016 | Matsuoka | B60L 15/025 701/41 |
| 2017/0073002 A1* | 3/2017 | Inokuchi | B62D 7/20 |
| 2017/0151981 A1* | 6/2017 | Suzuki | B62D 15/0225 |
| 2017/0259844 A1* | 9/2017 | Asakura | F16H 7/023 |
| 2018/0079415 A1* | 3/2018 | Moriya | B60W 30/18145 |
| 2018/0264929 A1* | 9/2018 | Tamura | B60K 7/00 |
| 2019/0054916 A1* | 2/2019 | Akiyama | B60W 30/12 |
| 2019/0168746 A1* | 6/2019 | Roemer | B62D 9/002 |
| 2019/0315243 A1* | 10/2019 | Kodera | B60L 53/68 |
| 2019/0381989 A1* | 12/2019 | Nozu | B60W 10/08 |
| 2020/0353931 A1* | 11/2020 | Römer | B62D 11/02 |
| 2021/0309192 A1* | 10/2021 | Balogh | B60T 8/28 |
| 2022/0169259 A1* | 6/2022 | Wang | B60K 7/0007 |
| 2022/0185096 A1* | 6/2022 | Ameye | B62D 5/0418 |

\* cited by examiner

DURING NEUTRAL (RH)  DURING LEFT TURN(RH)  DURING RIGHT TURN(RH)

CONTROL METHOD OF REDUCING A STEERING LOAD OF AN IN-WHEEL MOTOR VEHICLE

CROSS-REFERENCE TO RELATED APPLICATION

This application claims under 35 U.S.C. § 119(a) the benefit of priority to Korean Patent Application No. 10-2019-0153067 filed on Nov. 26, 2019, the entire contents of which are incorporated herein by reference.

BACKGROUND

(a) Technical Field

The present disclosure relates to a control method of an in-wheel motor vehicle, and more particularly, to a control method capable of reducing the steering load in an in-wheel motor vehicle.

(b) Background Art

Recently, a vehicle that runs by driving a motor by using the electric energy stored in a battery without using a fossil fuel such as gasoline or diesel has been developed, and an electric vehicle, a fuel cell vehicle, a hybrid vehicle, and the like are known as the motor driven vehicle.

Further, an in-wheel system is introduced as a representative example of a motor driven system, and the in-wheel system is a system that has an in-wheel motor mounted in each wheel of a vehicle (vehicle wheel) so that each wheel of the vehicle may be driven and controlled independently by the in-wheel motor.

Since a typical in-wheel system is configured so that the power output from the in-wheel motor disposed inside the wheel may be delivered directly to the wheel, it has the advantages of a simple drive system and excellent space utilization.

In other words, in the case of applying the in-wheel motor, it is possible to omit driving devices and power delivery devices, such as an engine, a transmission, and a gear. Thus, the weight of the vehicle may be reduced, and energy loss in the power delivery process may be greatly reduced.

Further, since driving of each wheel may be independently controlled through the in-wheel motor, an individual torque control for each wheel is possible. Thus, behavior performance of the vehicle may be enhanced.

Meanwhile, comparing the steering load between when braking a front wheel and tire and when not braking the front wheel and tire at the time of evaluating the steering capacity of the vehicle, the steering load when braking is about 7 to 10% larger than the case when not braking.

If the steering capacity is not enough compared to the steering load, the steering performance and quality of the vehicle may be lower than driver's desired levels.

At this time, the load is delivered as it is without damping when the disturbance acts through the road, and the like during the running of the vehicle, and if the disturbance and the load are delivered to the driver, the steering feeling felt by the driver may also be greatly reduced.

Therefore, there conventionally occurs a problem that the steering capacity should be set one step higher considering performance and quality such as the steering load and the steering feeling. Thus, weight and material cost are increased.

The above information disclosed in this Background section is only for enhancement of understanding of the background of the disclosure and thus it may contain information that does not form the prior art that is already known in this country to a person of ordinary skill in the art.

SUMMARY OF THE DISCLOSURE

Therefore, the present disclosure is intended to solve the above problem, and an object of the present disclosure is to provide a control method capable of reducing the steering load during the steering in an in-wheel motor vehicle.

For achieving the object, according to an embodiment of the present disclosure, a control method of an in-wheel motor vehicle is provided. The control method includes: determining, by a controller, a state of a steering load that is a load of a steering system; maintaining, by the controller, a front wheel brake in a released state, when the state of the steering load is in a high load state of a predetermined level or more; determining, by the controller, a tire angle of a front wheel according to a driver steering input based on driver steering input information in the released state of the front wheel brake; determining, by the controller, a required tire rotational angle of the front wheel by using the determined tire angle of the front wheel; and reducing, by the controller, the steering load by driving an in-wheel motor of the front wheel for a compensation by the determined required tire rotational angle of the front wheel.

As an embodiment, in the determining of the state of the steering load, the controller may be set to determine a motor current to be applied to a steering motor during a driver steering, and to determine that the state of the steering load is in the high load state of the predetermined level or more, when the determined motor current is equal to or higher than a predetermined reference value.

Further, as an embodiment, in the determining of the state of the steering load, the controller may be set to determine a torque at which a steering motor should output during a driver steering, and to determine that the state of the steering load is in the high load state of the predetermined level or more, when the determined torque is equal to or higher than a predetermined reference value.

Further, as an embodiment, in the determining of the state of the steering load, the controller may be set to determine a motor current to be applied to a steering motor during a driver steering, and to determine that the state of the steering load is in the high load state of the predetermined level or more, when the determined motor current is equal to or higher than a current value of a predetermined reference ratio relative to the maximum current amount that may be applied to the steering motor.

Further, in the maintaining of the front wheel brake in the released state, the controller may be set to control a brake device to forcibly release the front wheel brake in a brake pedal operating state by the driver, when the state of the steering load is in the high load state. After performing the reducing of the steering load, the controller may be set to control a brake device to resume and restore an operation of the front wheel brake according to the driver brake pedal operating state when the brake pedal operating state by the driver is maintained.

Further, in the maintaining of the front wheel brake in the released state, the controller may be set to maintain an operating state of a rear wheel brake, when the state of the steering load is in the high load state and is in the brake pedal operating state by the driver.

Further, in the determining of the tire angle of the front wheel, the controller may be set to determine the tire angle of the front wheel corresponding to a detected steering angle by using a map or a table from the steering angle detected by a steering angle sensor during a driver steering.

Further, in the determining of the tire angle of the front wheel, the controller may be set to determine the tire angle of the front wheel by using a predetermined formula from steering angle information detected by a steering angle sensor during a driver steering and setting information on a vehicle steering system.

Further, in the determining of the required tire rotational angle of the front wheel, the controller may be set to determine the required tire rotational angle of the front wheel by using the determined tire angle of the front wheel, a distance from a kingpin axis to a wheel center, and a tire radius.

Further, in the determining of the required tire rotational angle of the front wheel, the controller may be set to determine a wheel center movement distance before and after the steering by using the determined tire angle of the front wheel and a distance from a kingpin axis to a wheel center, and to determine the required tire rotational angle of the front wheel by using the determined wheel center movement distance and a tire radius.

Therefore, according to the control method during the steering of the in-wheel motor vehicle according to the present disclosure, it is possible to perform the load reduction compensation control for forcibly driving the in-wheel motor of the front wheel to which the direction is changed during the steering according to the driver steering input. Thus, the reduction in the steering load may be achieved.

It should be understood that the terms "vehicle" or "vehicular" or other similar terms as used herein include motor vehicles in general, such as: passenger automobiles including sports utility vehicles (operation SUV), buses, trucks, and various commercial vehicles; watercraft including a variety of boats and ships; aircraft; and the like. The terms "vehicle" or "vehicular" or other similar terms as used herein also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed below.

BRIEF DESCRIPTION OF THE DRAWINGS

The above and other features of the present disclosure are described in detail with reference to certain embodiments thereof illustrated the accompanying drawings, which are given herein below by way of illustration only, and thus do not limit the present disclosure, and wherein.

Figure 1:
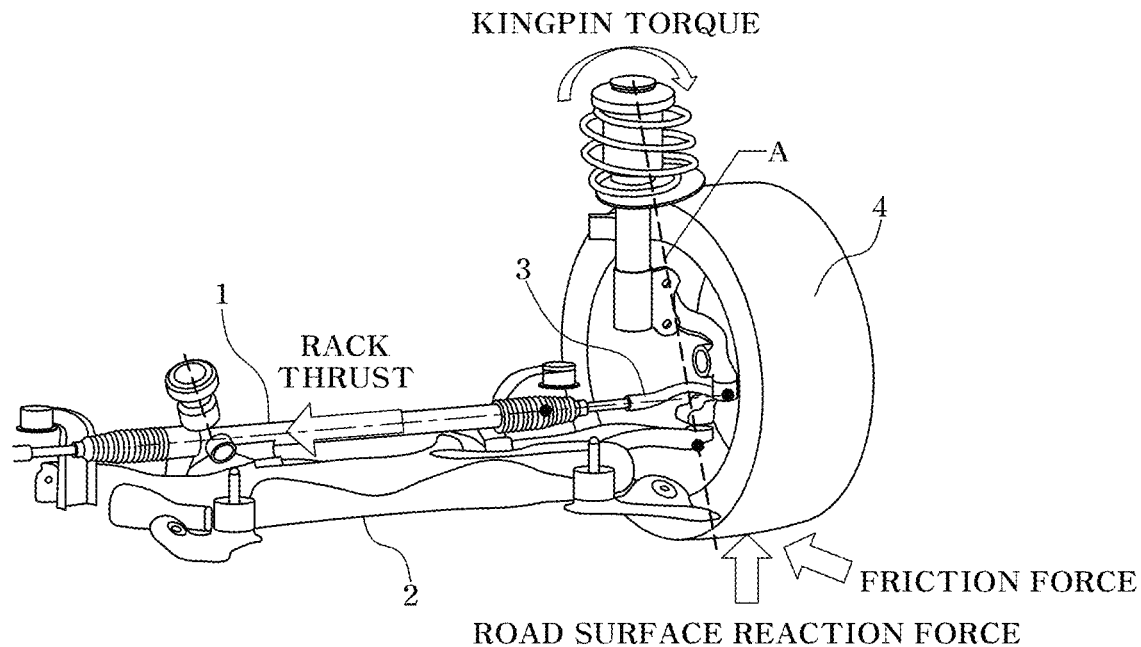
FIG. 1 is a configuration diagram illustrating a steering system of a vehicle to which the present disclosure may be applied.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes should be determined in section by the particular intended application and use environment.

In the figures, same reference numbers refer to the same or equivalent sections of the present disclosure throughout the several figures of the drawing.

DETAILED DESCRIPTION

Hereinafter, embodiments of the present disclosure are described in detail with reference to the accompanying drawings so that those having ordinary skill in the art may easily carry out the present disclosure. However, the present disclosure is not limited to the embodiments described herein and may also be embodied in other forms.

Throughout the specification, when any part is referred to "include" any component, this means that it may further include other components rather than excluding other components unless otherwise stated. When a component, device, element, or the like of the present disclosure is described as having a purpose or performing an operation, function, or the like, the component, device, or element should be considered herein as being "configured to" meet that purpose or to perform that operation or function. Further, the controller or controllers described herein may include a processor programmed to perform the noted operation, function, operation, or the like.

The present disclosure relates to a control method during the steering of an in-wheel motor vehicle and is to provide a control method capable of reducing the steering load during the steering in an in-wheel motor vehicle.

In the present disclosure, in order to solve the conventional problem, instead of setting the steering capacity unnecessarily high in the in-wheel motor vehicle, it is possible to use a method of reducing the steering load through a cooperative control with an in-wheel system, and to reduce the steering load through a cooperative control with the in-wheel system. Thus, the steering load even may be always met without increasing the steering capacity.

Further, the present disclosure proposes control logic that may reduce a tire friction force through a left and right in-wheel motor control of a front wheel side during the driver steering by using the characteristics of the in-wheel system and the characteristics of the tire to rotate during the steering. Thus, the steering load may be reduced.

The present disclosure may be applied to a vehicle mounted with a Motor Driven Power Steering System (MDPS) and an in-wheel system, and an in-wheel motor control (a compensation control for reducing the load) of a front wheel in which is the steering (direction change) is performed to reduce the steering load.

FIG. 1 is a configuration diagram illustrating a steering system of a vehicle to which the present disclosure may be applied, and illustrates a gearbox 1 for changing a direction of a tire 4 by converting a rotational force delivered from a steering column into a straight force, and a tie rod 3 for delivering the straight force of the gearbox 1 to the tire 4.

In FIG. 1, a line A refers to a kingpin axis, and a reference numeral 2 refers to a subframe, which is a portion of the vehicle body mounted with the gearbox 1.

In FIG. 1, a known in-wheel motor has been omitted.

Referring to FIG. 1, it illustrates a kingpin torque, which is a rotational torque acting around a kingpin axis (steering axis) (A) that is the rotational center axis of the tire 4, a road surface reaction force and a frictional force acting due to the road surface, and a rack thrust, which is a straight force generated in the gearbox 1.

Figure 2:
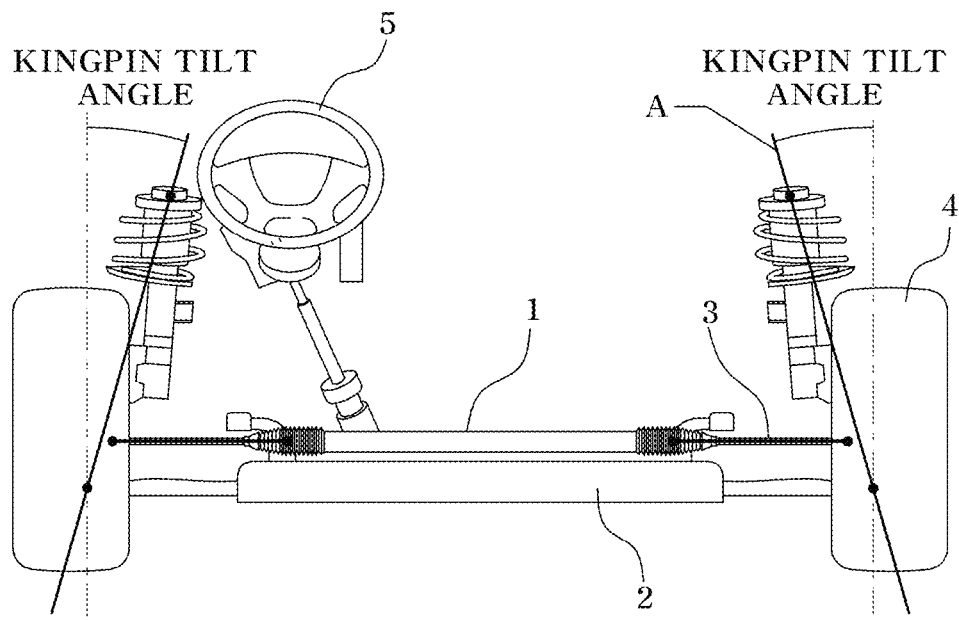
FIG. 2 is a diagram illustrating a kingpin tilt angle in the steering system of the vehicle to which the present disclosure may be applied.

FIG. 2 is a diagram illustrating a kingpin tilt angle in the steering system of the vehicle, and during the steering, i.e., when the rotation of the steering wheel 5 is operated, the tire 4 rotates around the kingpin axis (A), and the kingpin tilt angle refers to the angle at which the kingpin axis (A) is tilted with respect to the vertical line when viewing the vehicle from the front.

Figure 3:
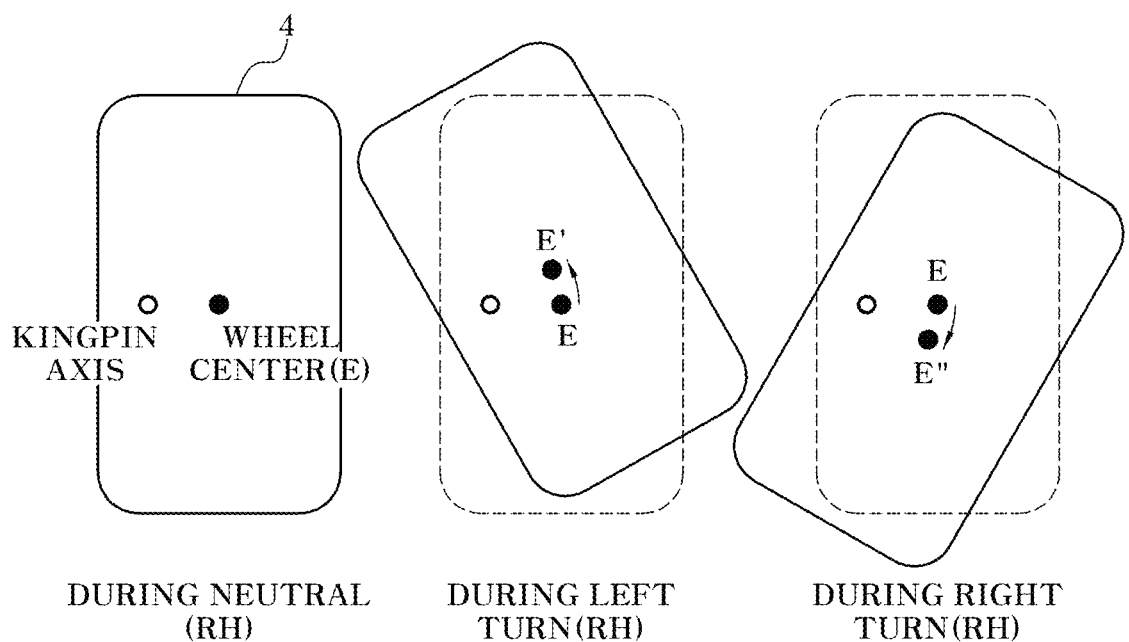
FIG. 3 is a diagram for explaining a state where a right tire is rotated during the steering of the vehicle to which the present disclosure may be applied.

FIG. 3 is a diagram for explaining a state where a right (RH) tire is rotated during the steering of the vehicle and is a plane diagram when viewing the tire 4 from the top.

In FIG. 3, E refers to the position of a wheel center during the neutral before the steering, E' refers to the position of the wheel center having moved during the left turn, and E" refers to the position of the wheel center having moved during the right turn.

When the driver steers, i.e., when the rotation of the steering wheel 5 is operated without depressing a brake pedal in a vehicle stopped state, as illustrated in FIG. 3, the outside vehicle wheel of the turning vehicle, i.e., the outer wheel rotates the tire 4 forwards, and the inner wheel that is the inside vehicle wheel rotates the tire backwards.

In other words, comparing the tire position (wheel center) before and after the steering when the tire 4 rotates around the kingpin axis (A) during the steering, as illustrated in FIG. 3, the wheel center of the right (RH) tire 4 moves forwards around the kingpin axis during the left turn in which the vehicle turns to the left by the driver steering to the left, and the wheel center of the right (RH) tire 4 moves backwards around the kingpin axis during the right turn.

The present disclosure uses this principle, and as the main feature, rotates the in-wheel motor in a direction in which the tire rotates (being a movement direction of the wheel center) during the steering of the in-wheel motor vehicle. Thus, the steering load may be reduced.

Extremely, the present disclosure may also allow the steering wheel to rotate through the in-wheel motor control even if the driver does not steer.

Hereinafter, a control method of the present disclosure is described in more detail with reference to the drawings as follows.

The present disclosure may be applied to a vehicle mounted with a Motor Driven Power Steering System (MDPS) and an in-wheel system. As discussed above, the motor driven power steering system is configured to assist the steering force of the driver by using the output torque of an electric motor.

A motor driven power steering system or MDPS may be configured to include sensors such as: a steering angle sensor for detecting a steering angle (column input angle) according to a driver steering wheel operation; a torque sensor for detecting a driver steering torque (steering wheel torque, column torque) input through a steering wheel; a vehicle speed sensor; a wheel speed sensor; an acceleration sensor; an engine RPM sensor; and a yaw rate sensor. The MDPS may also be configured to include a controller (MDPS ECU) and a steering motor (MDPS motor).

In this configuration, the controller obtains driver steering input information such as a steering angle, a steering angular speed, and a steering torque, and vehicle state information such as a vehicle speed, a wheel speed, an acceleration, an engine RPM, and a yaw rate from the signals of the sensors in order to control the driving and output of the steering motor.

The controller controls the output of the steering motor based on the driver steering input information and the vehicle state information so that the adjusted torque for the steering assist is generated. In the typical motor driven power steering system, the output control of the steering motor may be performed by controlling the motor current applied to the steering motor by the controller.

At this time, the controller determines the motor current based on the information collected from the vehicle, i.e., the driver steering input information and the vehicle state information and then applies it to the steering motor (MDPS motor). The controller generates a steering assist torque that is a force for assisting the driver steering force through the motor drive at this time.

As described above, when the driver inputs the steering, the motor current applied to the steering motor is determined as described above, and in the present disclosure, the controller determines the load (the steering load) condition of the steering system based on the motor current determined as described above.

Figure 4:
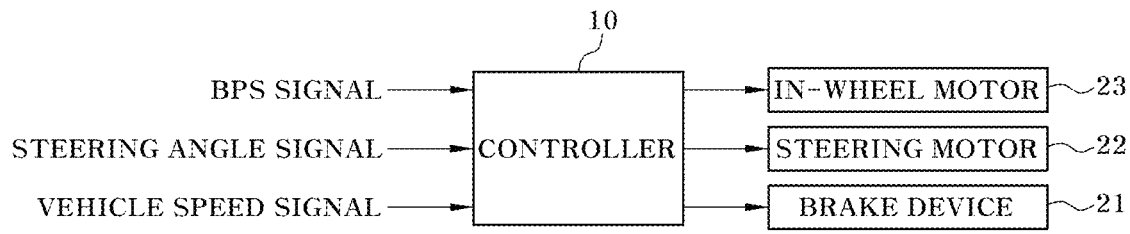
FIG. 4 is a block diagram illustrating a configuration of a system for performing a control process according to the present disclosure.
Figure 5:
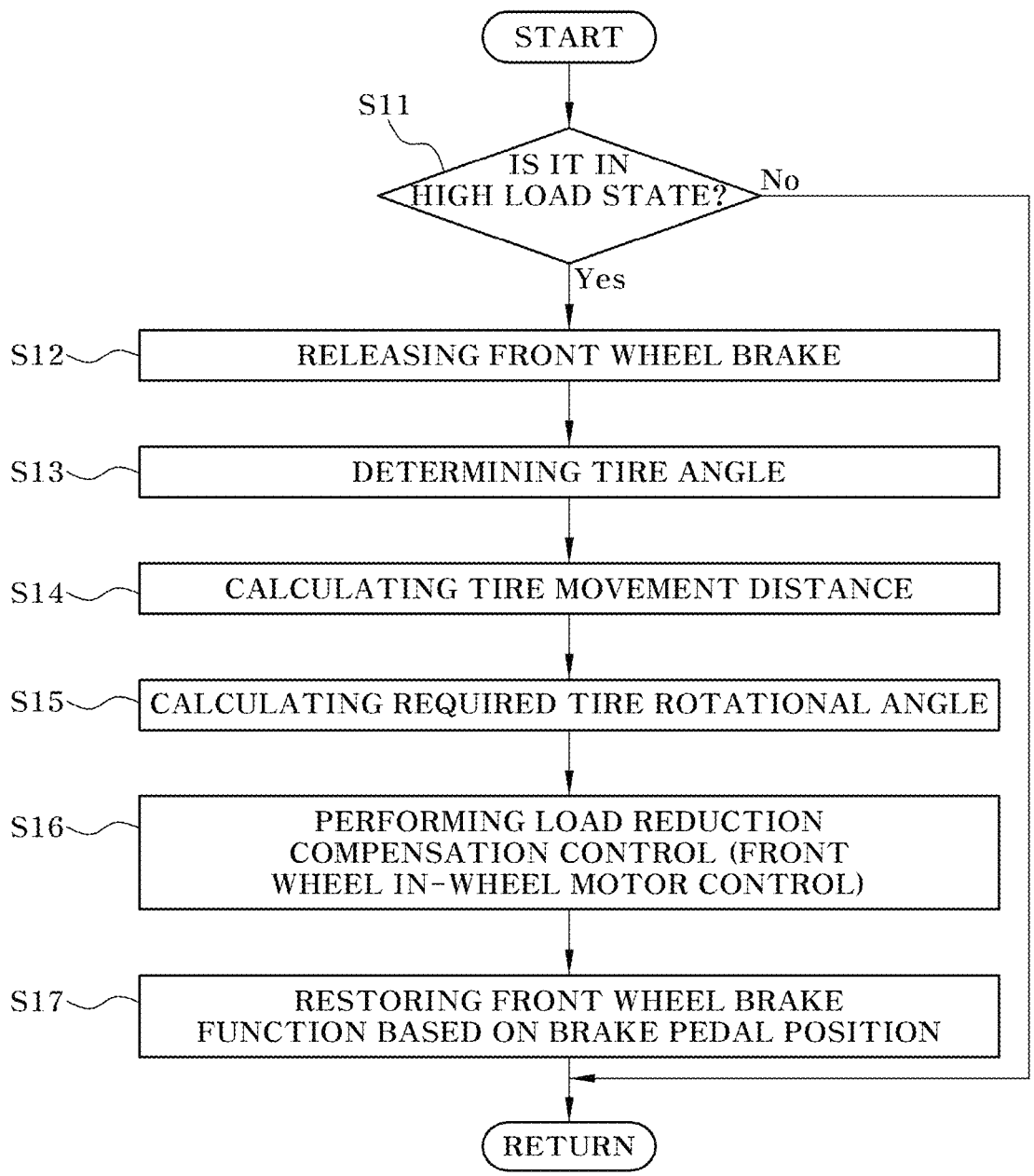
FIG. 5 is a flowchart illustrating a control method according to the present disclosure.

FIG. 4 is a block diagram illustrating a configuration of a system for performing a control process according to the present disclosure. FIG. 5 is a flowchart illustrating a control method during the steering of the in-wheel motor vehicle according to the present disclosure.

The control process described below may be performed by a plurality of controllers for performing a cooperative control, such as a controller of a steering system, a brake controller, a vehicle controller, and a motor controller, but may also be performed by one integrated control element, and in the following description, a plurality of controllers and one integrated control element are collectively referred to as a controller.

First, a controller 10 receives the driver steering input information such as a steering angle and the vehicle state information such as a vehicle speed to determine the motor current to be applied to a steering motor 22. The controller 10 also determines the load (the steering load) state of the steering system from the thus determined motor current (S11).

Here, the motor current may be replaced with a steering assist torque, which is a torque that the steering motor 22 should output during the driver steering. In addition, the steering assist torque or the motor current may be another control value.

In an embodiment of the present disclosure, the controller 10 may be set to determine that the load (the steering load) of the steering system (MDPS) is in a high load state that is a predetermined level or more if the motor current is a predetermined reference value or more when determining the load state.

Here, instead of the reference value, a reference ratio, which is a predetermined ratio value relative to the maximum current amount that may be applied to the steering motor 22, may be used.

The reference value may be a current reference value corresponding to a reference ratio.

For example, when the reference ratio is set as 70% in the controller 10, the controller 10 may determine that it is currently in a high load state if the motor current is the current value of 70% or more relative to the maximum allowable current amount.

In another embodiment, a current value corresponding to 70% relative to the maximum current amount is set as the reference value in the controller 10, and the controller 10 may determine that it is currently in a high load state if the motor current is the reference value or more.

Meanwhile, when determining that it is in a high load state, the controller 10 controls a brake device 21 to maintain a brake of the front wheel, i.e., a front wheel brake, in which the steering is performed, in a released state (S12).

Here, if the controller for determining the load state is a controller of the steering system (MDPS ECU), the controller of the steering system releases the front wheel brake through a cooperative control with the brake controller to allow it to become a state where a drive control for the in-wheel motor of the front wheel is possible.

At this time, if a rear wheel brake is in an operating state, the rear wheel brake maintains the operating state without being released.

In other words, if it is in a state where the driver is depressing a brake pedal, the front wheel brake is forcibly released because the compensation control using a front wheel in-wheel motor 23 for the front wheel is performed to reduce the load of the steering system as described below. The rear wheel brake maintains the operating state without being released because the compensation control for the rear wheel is not performed.

Here, the controller 10 may determine whether the driver operates the brake pedal from the signal of a Brake Pedal Sensor (BPS).

The present disclosure forcibly drives the front wheel in-wheel motor 23 to compensate for the tire rotational angle of the front wheel as described later in order to reduce the load of the steering system, which is described in detail below.

Subsequently, the controller 10 determines the tire angle of the front wheel according to the steering angle (the driver steering input) based on the driver steering input information, i.e., the steering angle information (the information indicated by the steering angle signal in FIG. 4) detected by the steering angle sensor during the driver steering (S13), and at this time, the controller 10 may be provided to determine the tire angle by using a map or a table from the steering angle.

The map or the table is setting data that is used by being input and stored in advance in the controller 10 and may be data representing the correlation between the steering angle and the tire angle.

In other words, the map or the table is data in which the tire angle is set as a value according to the steering angle, and the controller 10 may determine the tire angle corresponding to the current steering angle by using the map or the table.

Here, the tire angle may include a tire outer wheel angle and a tire inner wheel angle, the tire outer wheel angle refers to the angle of the outside tire when the vehicle turns according to the driver steering, and the tire inner wheel angle refers to the angle of the inside tire.

Table 1 below represents an example of a table in which the tire angle for each steering angle has been tuned. Table 1 exemplifies a table that may be used to determine the tire outer wheel angle and the tire inner wheel angle from the steering angle.

TABLE 1

| Steering angle | Tire inner wheel angle | Tire outer wheel angle |
|---|---|---|
| 0 | 0 | 0 |
| 10 | 0.77 | 1.55 |
| 20 | 1.55 | 2.34 |

Although only the values of steering angles 0, 10, and 20 are illustrated in the above table, an interpolation method or the like may be used to determine the tire outer wheel angle and the tire inner wheel angle corresponding to the values between the steering angles 0, 10, and 20.

Further, although it has been described above that the map or the table may be used as the setting data above, the present disclosure may use a predetermined formula as the setting data for the controller 10 to determine the tire angle (the tire outer wheel angle and the tire inner wheel angle) by using the steering angle.

For example, the controller 10 may estimate the tire angle by using the formula from the setting information on the steering system, such as the steering gear ratio, each joint position of the steering system, and the kingpin axis, together with the steering angle detected in real time.

Next, if the tire angle of the front wheel is determined as described above, the controller 10 calculates the tire movement distance of the front wheel according to the driver steering input (i.e., the driver steering) by using the determined tire angle of the front wheel (S14).

Here, the tire movement distance may be a wheel center movement distance.

Figure 6:
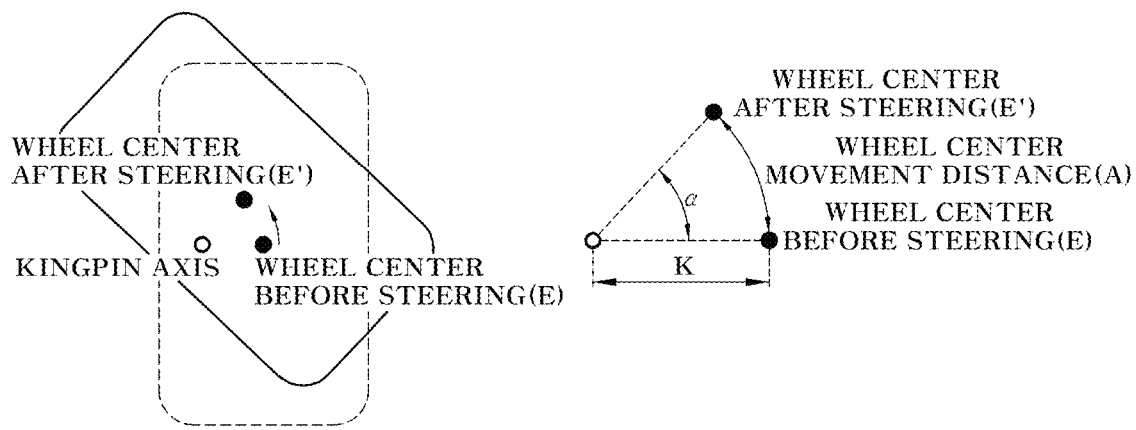
FIG. 6 is a diagram for explaining a method of calculating a wheel center movement distance (A) in the present disclosure.

FIG. 6 is a diagram for explaining a method of calculating the wheel center movement distance (A) in the present disclosure, and is a diagram illustrating the left turn of the right (RH) tire 4 as an example.

Even during the right turn of the right (RH) tire, the wheel center movement distance may be calculated in the same method considering the steering direction. At this time, the wheel center movement direction is opposite to the left turn as illustrated in FIG. 6.

Further, the wheel center movement distance may be calculated during the left turn and right turn of the left (LH) tire in the same method as in the left turn and right turn of the right (RH) tire. However, since the outer wheel and the inner wheel are determined according to the steering direction, the wheel center movement distance (A) of each front wheel tire corresponding to the steering direction may be calculated by using the outer wheel angle and the inner wheel angle if the tire outer wheel angle and the tire inner wheel angle according to the steering direction are determined.

Describing with reference to FIG. 6, the tire angle (the tire inner wheel angle and the tire outer wheel angle) (a) refers to an angle at which the tire 4 rotates around the kingpin axis during the steering when viewing the tire 4 from the top.

In FIG. 6, K refers to the distance from the kingpin axis to the wheel center, α refers to the tire angle, E refers to the position of the wheel center before the steering, and E' refers to the position of the wheel center after the steering.

Further, A refers to the wheel center movement distance (the movement amount) before and after the steering, and the wheel center movement distance (A) may be represented by the following Equation 1.

$$A = 2\pi K \times (\alpha/360) \quad \text{Equation 1}$$

Figure 7:
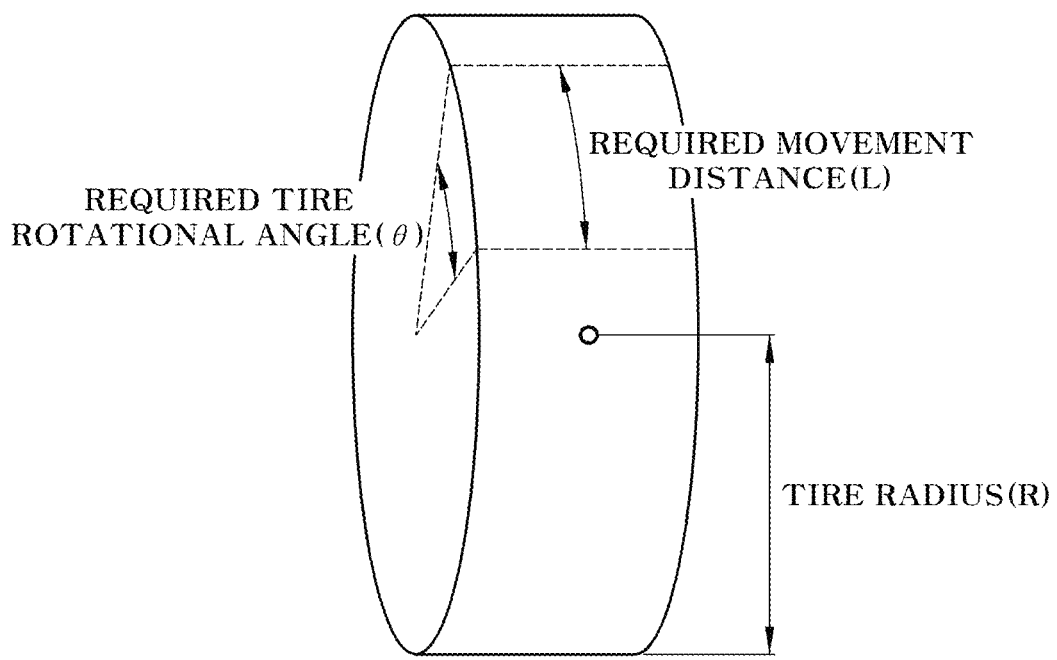
FIG. 7 is a diagram for explaining a method of calculating a required tire rotational angle in the present disclosure.

Next, the controller 10 determines the required tire rotational angle of the front wheel by using the wheel center movement distance (A) calculated as described above (S15). FIG. 7 is a diagram illustrating a method of calculating the required tire rotational angle in the present disclosure.

As illustrated in FIG. 7, the required tire rotational angle ($\theta$) may be calculated by using a required movement distance (L) and a tire radius (R). The relationship between the required tire rotational angle, the required movement distance, and the tire radius is represented as in the following Equation 2.

$$\theta = L \times 360/(2\pi R) \quad \text{Equation 2}$$

Here, $\theta$ refers to the required tire rotational angle, L refers to the required movement distance, and R refers to the tire radius.

At this time, since the wheel center movement distance (A) obtained by the is Equation 1 is almost equal to the required movement distance (L) of the Equation 2 (A≈L), the required tire rotational angle ($\theta$) may be calculated by the following Equation 3 from the wheel center movement distance (A) and the tire radius (R), if it is regarded as 'A=L'.

$$\theta = A \times 360/(2\pi R) \quad \text{Equation 3}$$

In another embodiment, Equation 4 below may be obtained by substituting the Equation 1 into A of the Equation 3, and therefore, the required tire rotational angle ($\theta$) may be calculated by the following Equation 4 from the tire angle ($\alpha$).

$$\theta = K/R \times \alpha \quad \text{Equation 4}$$

As describe above, after the required tire rotational angle ($\theta$) has been determined, the controller 10 performs a compensation control for reducing the load (the steering load) of the steering system by using the in-wheel motor 23 of the corresponding front wheel based on the determined required tire rotational angle ($\theta$) of the front wheel (S16).

In the load reduction compensation control process, the controller 10 forcibly drives the in-wheel motor 23 of the front wheel by the amount corresponding to the required tire rotational angle ($\theta$). Thus, the load (the steering load) of the steering system may be reduced.

Here, if the controller for determining the required tire rotational angle ($\theta$) is a controller of the steering system (MDPS ECU), the controller may perform a cooperative control with the vehicle controller and the motor controller to perform a drive control for the in-wheel motor of the front wheel on which the steering is performed.

As described above, it is possible to forcibly drive the in-wheel motor 23 of the front wheel for the compensation by the required tire rotational angle ($\theta$) of the front wheel, and thus reduce the load of the steering system. Also, if the driver continues to depress the brake pedal after such compensation, the controller 10 allows the operation of the front wheel brake according to the driver brake pedal operation to be resumed and restored through the control of the brake device 21 (S17).

Therefore, according to the control method according to the present disclosure, it is possible to perform the load reduction compensation control of forcibly driving the in-wheel motor of the front wheel to which the direction is changed during the steering according to the driver steering input. Thus, the reduction in the steering load may be achieved.

As described above, although the embodiments of the present disclosure have been described in detail, the scope of the present disclosure is not limited thereto, and various modifications and improvements of those having ordinary skill in the art using the basic concept of the present disclosure defined in the following claims are also included in the scope of the present disclosure.

What is claimed is:

1. A control method of an in-wheel motor vehicle, comprising:
   determining, by a controller, a state of a steering load that is a load of a steering system;
   maintaining, by the controller, a front wheel brake in a released state, when the state of the steering load is in a high load state of a predetermined level or more;
   determining, by the controller, a tire angle of a front wheel according to a driver steering input based on driver steering input information in the released state of the front wheel brake;
   determining, by the controller, a required tire rotational angle of the front wheel by using the determined tire angle of the front wheel; and
   reducing, by the controller, the steering load by driving an in-wheel motor of the front wheel for a compensation by the determined required tire rotational angle of the front wheel.

2. The control method of the in-wheel motor vehicle of claim 1,
   wherein in the determining of the state of the steering load,
   the controller determines a motor current to be applied to a steering motor during a driver steering, and
   determines that the state of the steering load is in the high load state of the predetermined level or more, when the determined motor current is equal to or higher than a predetermined reference value.

3. The control method of the in-wheel motor vehicle of claim 1,
   wherein in the determining of the state of the steering load,
   the controller determines a torque which a steering motor is required to output during a driver steering, and
   determines that the state of the steering load is in the high load state of the predetermined level or more, when the determined torque is equal to or higher than a predetermined reference value.

4. The control method of the in-wheel motor vehicle of claim 1,
   wherein in the determining of the state of a steering load,
   the controller determines a motor current to be applied to a steering motor during the driver steering, and
   determines that the state of the steering load is in the high load state of the predetermined level or more, when the determined motor current is equal to or higher than a current value of a predetermined reference ratio relative to the maximum current amount that may be applied to the steering motor.

5. The control method of the in-wheel motor vehicle of claim 1,
   wherein in the maintaining of the front wheel brake in the released state, the controller controls a brake device to forcibly release the front wheel brake in a brake pedal operating state by the driver, when the state of the steering load is in the high load state, and
   wherein after performing the reducing of the steering load, the controller controls a brake device to resume and restore an operation of the front wheel brake according to the driver brake pedal operating state when the brake pedal operating state by the driver is maintained.

6. The control method of the in-wheel motor vehicle of claim 5,
wherein in the maintaining of the front wheel brake in the released state, the controller maintains an operating state of a rear wheel brake, when the state of the steering load is in the high load state and is in the brake pedal operating state by the driver.

7. The control method of the in-wheel motor vehicle of claim 1,
wherein in the determining of the tire angle of the front wheel, the controller determines the tire angle of the front wheel corresponding to a detected steering angle by using a map or a table from the steering angle detected by a steering angle sensor during a driver steering.

8. The control method of the in-wheel motor vehicle of claim 1,
wherein in the determining of the tire angle of the front wheel, the controller determines the tire angle of the front wheel by using a predetermined formula from steering angle information detected by a steering angle sensor during a driver steering and setting information on a vehicle steering system.

9. The control method of the in-wheel motor vehicle of claim 1,
wherein in the determining of the required tire rotational angle of the front wheel, the controller determines the required tire rotational angle of the front wheel by using the determined tire angle of the front wheel, a distance from a kingpin axis to a wheel center, and a tire radius.

10. The control method of the in-wheel motor vehicle of claim 1,
wherein in the determining of the required tire rotational angle of the front wheel, the controller determines a wheel center movement distance before and after the steering by using the determined tire angle of the front wheel and a distance from a kingpin axis to a wheel center, and
determines the required tire rotational angle of the front wheel by using the determined wheel center movement distance and a tire radius.

\* \* \* \* \*